United States Patent
Garner et al.

[19]

[11] Patent Number: 5,890,056
[45] Date of Patent: Mar. 30, 1999

[54] CHANNEL USAGE MONITORING ARRANGEMENT FOR BASE STATION

[75] Inventors: William J. Garner, Yardley, Pa.; Winston Hong Lieu, Somerset, N.J.

[73] Assignee: Lucent Technologies, Inc., Murray Hil, N.J.

[21] Appl. No.: 679,408

[22] Filed: Jul. 9, 1996

[51] Int. Cl.⁶ .................................................. H04B 17/00
[52] U.S. Cl. .......................................... 455/67.1; 455/561
[58] Field of Search ..................................... 455/454, 426, 455/432, 561, 562, 180, 188.1, 73, 78, 82, 83, 84, 86, 67.1

[56] References Cited

U.S. PATENT DOCUMENTS

| | | | |
|---|---|---|---|
| 4,980,660 | 12/1990 | Nakamura et al. | 333/101 |
| 5,175,872 | 12/1992 | Borras | 455/76 |
| 5,179,721 | 1/1993 | Comroe et al. | 455/67.1 |
| 5,276,914 | 1/1994 | Ishizuka et al. | 455/83 |
| 5,363,402 | 11/1994 | Harmon | 375/1 |
| 5,371,898 | 12/1994 | Grube et al. | 455/67.1 |
| 5,386,203 | 1/1995 | Ishihara | 333/129 |
| 5,488,649 | 1/1996 | Schellinger | 379/62 |
| 5,526,403 | 6/1996 | Tam | 455/426 |
| 5,659,886 | 8/1997 | Taira et al. | 455/81 |

*Primary Examiner*—Edward F. Urban
*Assistant Examiner*—Darnell R. Armstrong

[57] ABSTRACT

In one embodiment the present invention includes an arrangement for monitoring RF signals for use in a base station, said arrangement comprising a demodulation circuit operable to demodulate RF signals, an RF signal transceiver, and a controller. The RF signal transceiver is operable to transmit downlink RF signals to a wireless terminal and receive uplink RF signals from the wireless terminal. The RF transceiver further comprises: an antenna operable to receive first RF signals within a first frequency band and second RF signals within a second frequency band; a signal router connected to the antenna and having first and second ports, said signal router operable to provide signals within the first frequency band to the first port and signals within the second frequency band to the second port; a first RF switch connected to the first port; a first RF signal path connected to the first RF switch; a second RF signal path connected to the second port, and a second RF switch connected to the first RF signal path and the second RF signal path, said second RF switch having an output for connection to the demodulation circuit. The controller is operably connected to the first RF switch, the second RF switch, and the demodulation circuit. The controller causes the first RF switch to connect the first signal path to the first signal port and further causes the second RF switch to connect the first RF signal path to the demodulation circuit to facilitate monitoring of the first RF signals, and wherein the controller causes the second RF switch to connect the second signal path to the demodulation circuit to facilitate monitoring of the second RF signals.

24 Claims, 4 Drawing Sheets

CHANNEL USAGE MONITORING ARRANGEMENT FOR BASE STATION

FIELD OF THE INVENTION

The present invention relates generally to the field of telecommunications, and in particular, to the field of personal wireless communications.

BACKGROUND OF THE INVENTION

The use of wireless communications, and particularly, cellular telephony, has risen dramatically. Most wireless communications are carried out over commercial wireless networks, including commercial cellular networks. A commercial wireless network is composed of, among other things, a plurality of geographically dispersed base stations that carry on radio frequency signal communication with the wireless terminals. The wireless network facilitates communication among wireless network subscribers and, more significantly, between wireless network subscribers and subscribers of an external communications network, such as a public switched telephone network ("PSTN").

Typically, wireless terminals or telephones designed for compatibility with a commercial wireless network are limited to use only within that or a similar commercial wireless network. Commercial wireless networks typically charge for each use of wireless network equipment and services, or in other words, for each telephone call. As a result, every time such a wireless terminal is used, the subscriber incurs wireless network service charges in addition to ordinary telephone service charges. Recently, however, telecommunication devices known as personal base stations have been developed that allow wireless terminals designed for use with a commercial wireless network to communicate without using the commercial wireless network. Similar to base stations in a commercial wireless network, personal base stations provide a communication link to a wireless terminal using radio frequency signals. Such radio frequency signals are in the frequency band normally allocated to cellular or wireless service. Personal base stations ("PBS") are also connected directly to the external network in the same or similar manner as other customer premise equipment to facilitate communication with the external network. In this manner, a PBS enables wireless terminals to enjoy the benefits of cordless communications without incurring the charges of a commercial wireless network service provider. Moreover, when the wireless terminal is moved out from the proximity of the PBS and into the proximity of a commercial wireless network, it may then provide communication services using the commercial wireless network.

The PBS, therefore, is useful in a residence or office environment. Consider the use of a PBS in the residence of a subscriber that owns a cellular telephone and subscribes to a commercial cellular network. When the subscriber leaves the residence and attends to outside activities, the subscriber may utilize the cellular phone by communicating through the commercial cellular network. While using the commercial cellular network, the subscriber incurs service charges associated with such cellular service. When the subscriber is located within the residence, however, the subscriber may use the cellular phone by communicating through the PBS, which avoids the commercial cellular network charges.

Special problems have arisen with the implementation of PBS equipment, and in particular, PBS equipment that is compatible with digital wireless terminals. One such problem relates to potential signal interference between PBS-serviced calls and wireless network-serviced calls. As discussed above, the PBS and wireless networks use the same RF channels. If a PBS is located within the service area of a commercial wireless network, the possibility of signal interference is substantial.

One method of addressing the interference problem is to require the PBS to monitor the RF channels normally allocated to any nearby wireless network. If the PBS detects activity on a monitored RF channel, then the PBS may select a different RF channel to provide call service. In the wireless communication industry, each channel consists of a frequency pair, one frequency allocated to uplink signals, i.e., signals transmitted by the wireless terminal to the base station, and the other frequency allocated to downlink signals, i.e., signals transmitted by the base station to the wireless terminal. The uplink signal frequencies for all channels are uniformly within a defined contiguous spectrum, referred to as the uplink channel spectrum. Likewise, the downlink signal frequencies for all channels are uniformly within a different contiguous spectrum, referred to as the downlink channel spectrum. In the cellular telephone industry, the uplink channel spectrum is defined as between 824 and 849 MHz and the downlink channel spectrum is defined as between 869 and 894 MHz. Thus, for example, a frequency pair might comprise an 834 MHz uplink channel frequency and an 879 MHz downlink channel frequency. In another wireless industry known as the personal communication system ("PCS"), the uplink channel spectrum is defined as between 1849.98 MHz and 1909.95 the downlink channel spectrum is defined as between 1930.02 MHz and 1989.89 MHz.

The PBS may monitor RF channels by measuring the signal strength present on each channel. A channel is more likely to be available if there is sufficiently little or no signal strength detected on either of that channel's uplink or downlink signal frequencies. The PBS uses such channel monitoring information as one of several factors in selecting an RF channel for a telephone call. In this manner, the PBS attempts to avoid channels that are already in use by nearby commercial wireless network equipment.

The wireless network channel usage monitoring, or simply channel monitoring, technique discussed above is difficult to implement. The implementation difficulties stem from, among other things, the usage of duplexers. The purpose of the duplexer is to route and isolate received ("Rx") signals and transmitted ("Tx") signals within the PBS. A duplexer is a three port device that essentially comprises a pair of RF band pass filters. The three ports include an antenna port, a receive ("Rx") port and a transmit ("Tx") port. One band pass filter is connected to antenna port and the Rx port and has a pass band allocated to the entire uplink (or Rx) channel spectrum. The other band pass filter is connected to the antenna port and the Tx port, and has a pass band allocated to the entire downlink (or Tx) channel spectrum. The duplexer thus ensures the separation of uplink and downlink signals, regardless of the selected channel. A prior art personal base station that employs such a duplexer is described, for example, in U.S. Pat. No. 5,488,649 to Schellinger.

The problem with the prior art personal base station configuration, such as the one described in U.S. Pat. No. 5,488,649, is that the PBS cannot receive signals in the downlink channel spectrum, and therefore, cannot monitor signals in that spectrum. The duplexer, by the nature of its filtering and routing operation, routes signals in the downlink channel spectrum "upstream" to the transmission circuitry of the PBS, and not to the reception circuitry. Only the reception circuitry, and not the transmission circuitry, can properly process the incoming signal to facilitate a signal strength measurement. Accordingly, such prior art base stations can only monitor uplink channel frequencies and must rely on external equipment to provide information on whether there is activity on a particular downlink channel frequency.

Accordingly, there is a need for a personal base station that uses the duplexer technology that is capable of receiving and monitoring signals in both the uplink and downlink channel spectra in order to determine channel availability.

SUMMARY OF THE INVENTION

The present invention includes methods and apparatus for transmitting and receiving RF signals in a base station that uses an RF switching scheme to route signals from one port of a duplexer to receiver circuitry, for example, a demodulator, when the base station is monitoring uplink channel frequencies and route signals from another port of the duplexer to the receiver circuitry when the base station is monitoring downlink channel frequencies. The RF switching scheme allows the base station to perform channel monitoring directly.

In one embodiment, the present invention includes an arrangement for monitoring RF signals in a base station, said arrangement comprising a demodulation circuit operable to demodulate RF signals, an RF signal transceiver, and a controller. The RF signal transceiver is operable to transmit downlink RF signals to a wireless terminal and receive uplink RF signals from the wireless terminal. The RF transceiver further comprises: an antenna operable to receive first signals within a first frequency band and receive second signals within a second frequency band; a signal router connected to the antenna and having first and second ports, said signal router operable to provide signals within the first frequency band to the first port and signals within the second frequency band to the second port; a first RF switch connected to the first port; a first RF signal path connected to the first RF switch; a second RF signal path connected to the second port; and a second RF switch connected to the first RF signal path and the second RF signal path, said second RF switch having an output for connection to the demodulation circuit.

The controller is operably connected to the first RF switch and the second RF switch. The controller causes the first RF switch to connect the first signal path to the first signal port and further causes the second RF switch to connect the first RF signal path to the demodulation circuit to facilitate monitoring of the first RF signals, and wherein the controller causes the second RF switch to connect the second signal path to the demodulation circuit to facilitate monitoring of the second RF signals.

The above described RF transceiver facilitates signal monitoring in both the first (downlink) frequency band and the second (uplink) frequency band. The demodulator performs RF demodulation and other processing steps to generate baseband signals from which channel monitoring measurements may be made.

The above described features and advantages, as well as others, will become readily apparent to those of ordinary skill in the art by reference to the following detailed description and accompanying drawings.

DETAILED DESCRIPTION

Figure 1:
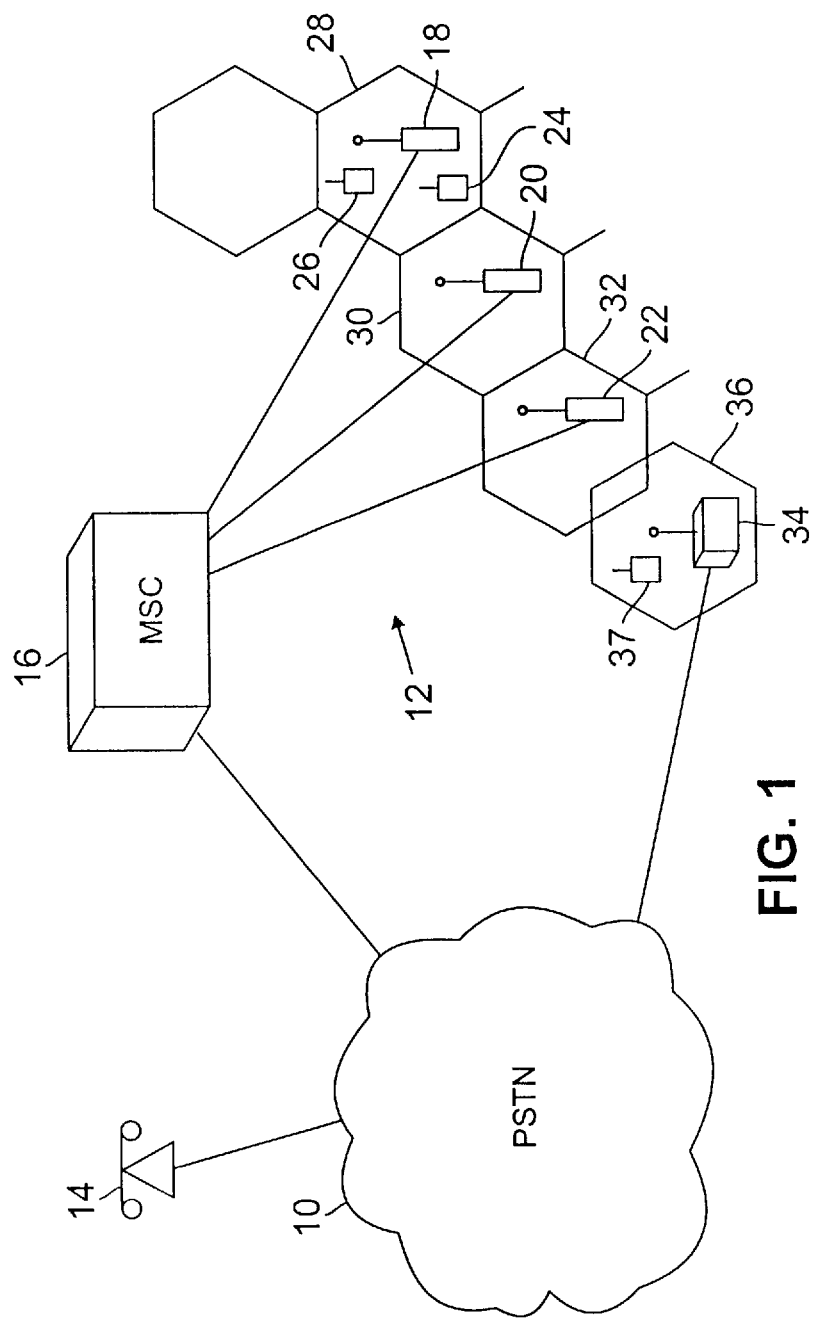
FIG. 1 illustrates an exemplary communication network including a wireless network, a public switched telephone network, and a personal base station.

FIG. 1 illustrates an exemplary communication network including a public switched telephone network ("PSTN") 10, a wireless network 12, and a personal base station 34. The PSTN 10 is a communication network associated with ordinary telephone service that typically includes a combination of local offices, toll offices and long distance networks (not shown). The PSTN 10 provides telephone service over a substantial geographical region. The PSTN 10 is operably connected to subscriber equipment of several network subscribers, including the exemplary subscriber set 14.

The exemplary wireless network 12 illustrated in FIG. 1 includes a mobile switching center 16, a first base station 18, a second base station 20 and a third base station 22. The mobile switching center 16 is operably connected through voice and/or data trunks to each of the base stations 18, 20 and 22. The mobile switching center 16 is further operably connected to the PSTN 10. The PBS 34 is also operably connected to the PSTN 10. The above configuration is given by way of illustration only, and thus illustrates only the salient features of a communication network that are necessary to describe the context in which a PBS 34 operates. It is noted for example, that wireless networks often include more than one mobile switching center and well in excess of three base stations.

The wireless network 12 provides communication services to one or more wireless terminals. To this end, each base station services wireless terminals located within a prescribed service area. A base station services a wireless terminal by communicating call signals to and from the wireless terminal over a radio frequency pair. In particular, the first base station 18 services wireless terminals physically located within a first service area 28, which is loosely and symbolically defined as a hexagonal are surrounding the first base station 18. The second base station 20 services wireless terminals located within a similarly defined but geographical different second service area 30, and the third base station 22 services wireless terminals located within a third service area 32. It is noted that in practice the service areas are not strictly hexagonal and the service areas of more than one base station may overlap to some extent.

The PBS 34 provides wireless communication service to one or more wireless terminals, such as a wireless terminal 37, within a PBS service area 36. The structure of the PBS 34 is described in further detail below in connection with FIGS. 2 and 3.

In operation of the exemplary communication network, the PSTN 10, the PBS 34 and the wireless network 12 coordinate to provide communications by and among subscribers or users thereof. For example, the PSTN 10 facilitates communication between the subscriber set 14 and other subscriber equipment connected to the PSTN 10, not shown. The PSTN 10 also facilitates communication between the subscriber set 14 and both the PBS 34 and the wireless network 12.

The operation of the wireless network 12 is described in the context of an exemplary telephone call between a party using a wireless terminal 26 and a party using the subscriber set 14. In such an example, the wireless terminal 26, which is located within the first service area 28 generates (and receives) call signals containing speech or data. The call signals are communicated between the wireless terminal 26 and the base station 18 using a select channel or radio frequency pair. The base station 18 further communicates the call signals to and from the mobile switching center 16 through the voice and/or data trunks. The mobile switching center 16, in turn, operates in conjunction with the PSTN 10 to communicate the signals through the appropriate path to the subscriber set 14.

The exemplary call described above, as well as others like it, incur two separate fees, one for the PSTN service provider and one for the wireless network service provider. Specifically, the wireless network 12 is typically controlled or operated by a commercial entity which charges a per-call or per-minute fee for calls that utilize the services of the wireless network 12. Likewise, the PSTN 10 typically charges a fee for calls that utilize its services and equipment.

The PBS 34 operates in a manner similar to that of the base stations 18, 20 and 22. Specifically, the PBS 34 provides communication services to wireless terminals located within a PBS service area 36. The PBS service area 36 is typically geographically smaller than the first, second or third service areas 28, 30 or 32 respectively, because the PBS 34 is designed for customer-premise use. Because of the operational similarity between the PBS 34 and the first, second and third base station stations 18, 20 and 22, respectively, a wireless terminal such as the wireless terminal 26 may communicate using the PBS 34 if it is physically moved to a location within the service area 36. Accordingly, the same wireless terminal may be used to communicate using both the PBS 34 and the wireless network 12. Because the PBS 34 is generally intended to be used as customer-premise equipment, in other words, owned or leased by the customer, there are typically no per-call or per-minute fees associated with its use.

It is noted that the PBS service area 36 overlaps to some degree with one or more service areas of the wireless network 12, including, for example, the third service area 32. Because of this service area overlap, a wireless terminal 37 may be located within both the PBS service area 36 and the third service area 32. If the wireless terminal 37 utilizes the PBS 34 for a telephone call, its RF signals may potentially interfere with those of the third base station 22. Such interference occurs when a PBS-serviced telephone call uses the same RF channel as a concurrent telephone call that is serviced by the third base station 22. To prevent such interference, the PBS 34 performs a monitoring operation that detects which RF channels are in use, and attempts to avoid channels that are already in use.

It will be understood that although the PBS service area 36 is shown to overlap with only the third service area 32, in many systems a PBS service area will be totally encapsulated by one or more base station service areas of a commercial wireless network. In those situations, channel monitoring operation is even more critical to prevent interference.

The PBS 34 according to the present invention configures itself to monitor the RF channels during its idle state, or in other words, when it is not providing telecommunication services to one or more wireless terminals. During its idle state, the PBS 34 also performs other necessary functions, such as broadcasting to notify nearby wireless terminals that the PBS 34 is available for use. Such functions are similar to those performed by commercial wireless network base stations, and are outside the focus of the present invention. In any event, when the PBS 34 is called upon to provide call service to one or more wireless terminals, the PBS 34 reconfigures itself to provide wireless communication service and then selects an available RF channel for use in the telephone call. The PBS 34 and the methods by which it performs channel monitoring and call servicing are discussed in further detail below in connection with FIGS. 2 and 3.

Figure 2:
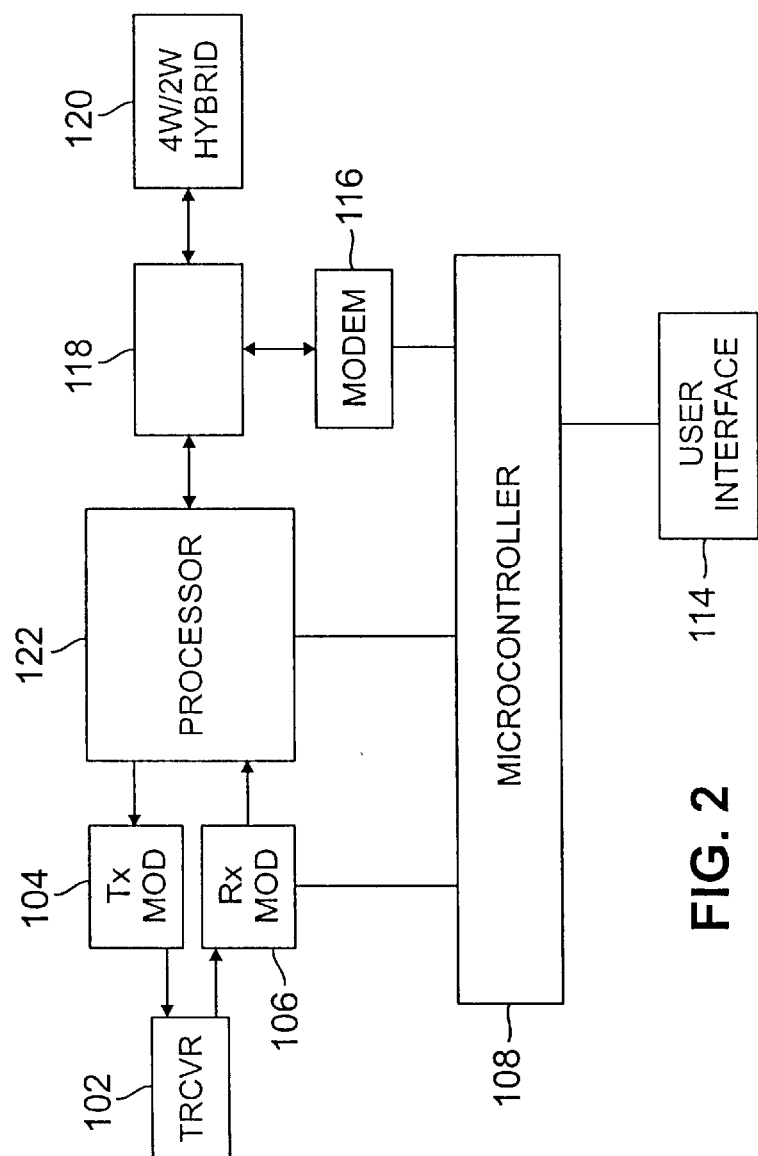
FIG. 2 illustrates a block diagram of a personal base station according to the present invention.

FIG. 2 illustrates a block diagram of a personal base station according to the present invention. In particular, FIG. 2 shows in further detail the PBS 34 of FIG. 1. For purposes of clarity, the various components of the PBS 34 in FIG. 2 are shown in block diagram form. Those of ordinary skill in the art could readily implement the corresponding detailed circuitry.

The PBS 34 includes an RF transceiver 102, a Tx modulator 104, an Rx demodulator 106, a controller 108, a user interface 114, a modem 116, a switch 118, a hybrid network 120 and a digital signal processor 122. The RF transceiver 102 is a single antenna RF transmitter and receiver that, in addition to transmitting and receiving call signals, is operable to provide monitoring signals to the Rx demodulator 106 regardless of whether the signals are in the base station Rx or uplink signal frequency spectrum or the base station Tx or downlink signal frequency spectrum. The RF transceiver 102 is connected to the both the Tx modulator 104 and the Rx demodulator 106.

The Tx modulator 104 has low output power, for example, 1 mW, and may therefore be similar to an RF modulator found in a generally available cellular or portable telephone. In general, the Tx modulator 104 includes known circuitry, such as a combination of oscillators, filters, phase-shifters and mixers, that modulates baseband digital communication signals onto RF carrier signals. For example, suitable modulation circuitry may include a frequency conversion stage and a W2010 modulator IC available from Lucent Technologies, Microelectronics Division, located in Allentown, Pa.

The Rx demodulator 106 may suitably be similar to an RF demodulator found in a generally available portable telephone. The Rx demodulator 106 also includes known circuitry, such as a combination of oscillators, mixers and filters, that demodulates a baseband digital communication signal from an RF carrier signal or intermediate frequency ("IF") signal. For example, suitable demodulation circuitry may include a W1575 demodulator IC available from Lucent Technologies, Microelectronics Division, located in Allentown, Pa.

The RF transceiver 102, the Tx modulator 104, and the Rx demodulator 106 are each connected to the controller 108, which controls their respective operations. The controller 108 is further connected to the user interface 114. The user interface 114 obtains operational information from the controller 108 and provides status indicators to the user based on the operational information. The user interface 114 may also include one or more input devices, such as push buttons, which allow the user to control to some extent the operation of the PBS 34. For example, a push button might allow the user to control whether the PBS 34 is powered for operation.

The Tx modulator 104 and Rx demodulator 106 are further operably connected to the digital signal processor ("DSP") 122. The DSP 122 is also connected to the controller 108 and to the switch 118. The modem 116 is connected to the controller 108 and the switch 118. The switch 118 is further connected to the hybrid network 120, and is operable to connect the hybrid network 120 with either of the modem 116 or the DSP 122. The hybrid network 120 is operably connected to an external telecommunication network, not shown.

Under the conditions described above in connection with FIG. 1, the PBS 34 has, in general, two modes of operation, a normal mode and a search mode. During normal mode, the PBS 34 provides call service, allowing wireless terminals to carry on telecommunications, or telephone calls, with parties to an external network, such as the PSTN 10 of FIG. 1. During its search mode operation, the PBS 34, among other things, monitors signals from nearby wireless equipment in order to determine RF channel availability. The PBS 34 will typically operate in search mode at any time that the PBS 34 is not providing call service to a wireless terminal. As soon as a call is initiated, the PBS 34 ceases operating in search mode and begins to operate in normal mode.

The search mode is now described in further detail. In search mode, the PBS 34 does not provide call service, and thus does not provide voice communication services between wireless terminals and the external network. Instead, the PBS 34 monitors the signal strength of any signals on all of the uplink channel frequencies and downlink channel frequencies. To this end, the controller 108 controls the operation of the transceiver 102 and the Rx demodulator 106 in the following manner.

To monitor uplink channel frequencies, which would include any signals transmitted by wireless terminals in the vicinity, the transceiver 102 first configures itself to provide the uplink channel frequencies to the Rx demodulator 106. The configuration of the transceiver 102 to provide the uplink channel frequencies to the Rx demodulator 106 is discussed in further detail below in connection with FIG. 3. The RF transceiver 102 then tunes to each individual uplink channel frequency, converts that channel frequency into an IF signal and provides the IF signal to the Rx demodulator 106. The Rx demodulator 106, by itself or in combination with other circuitry, measures the signal strength of the IF signal. The method of signal strength measurement that is employed, as well as the specific means therefor, are matters of design choice. For example, the demodulator 106 may include full wave rectification circuitry that obtains a DC voltage level from each signal that is indicative of signal strength. Such techniques are known to those of ordinary skill in the art.

To monitor downlink channel frequencies, which would include any signals transmitted by base stations in the vicinity, the transceiver 102 configures itself to provide the downlink channel frequencies to the demodulator 106. The configuration of the transceiver 102 to provide downlink channel frequencies to the Rx demodulator 106 is discussed in further detail below in connection with FIG. 3. The RF transceiver 102 then tunes to each individual downlink channel frequency, converts that channel frequency into an IF signal, and provides the IF signal to the Rx demodulator 106. As discussed above, the Rx demodulator 106, alone or in combination with other circuitry, measures the signal strength of the IF signal.

The signal strength information is provided to the controller 108, which then determines from the signal strength information which channels are available and which channels are in use. If the signal strength detected for both the Rx (or uplink) frequency and the Tx (or downlink) frequency of a particular channel are below a predetermined threshold, then the channel is considered to be available. If either of a channel frequency pair, in other words, either of the Tx frequency or Rx frequency is determined to have a signal strength at or above the predetermined threshold, then the channel is considered to be in use, and therefore not available. The predetermined threshold depends upon the signal strength measurement technique that is used, and may be determined empirically by those of ordinary skill in the art.

In normal mode operation, the PBS 34 supports a call, or provides call service, between a wireless terminal, not shown, and a party connected to the external telephone network, not shown. To this end, the PBS 34 provides signals from the external network to the wireless terminal, and from the wireless terminal to the external network.

In general, the wireless terminal uses a radio frequency signal to provide Rx or uplink signals to the RF transceiver 102. The uplink signals are, typically, RF carriers within the uplink frequency spectrum allotted to cellular service, and namely, 836 MHz+/−12.5 MHz, modulated by compressed digital signals representative of voice and/or data signals. The compressed digital signals are digital signals compressed or encoded by a method typically used in wireless telephony known as code excited linear prediction ("CELP") encoding, which is known in the art.

A call to be serviced by the PBS 34 may be initiated by either the wireless terminal, as in the case of an outgoing call, or by the party connected to the external network, as in the case of an incoming call. The initiation of outgoing calls, or the reception of signals indicating an incoming call, is performed by the modem 116. In other words, the modem 116 performs dialing, as well as receiving incoming call signaling. To facilitate call initiation, the switch 118 connects the modem 116 to the hybrid 120. Once the call is initiated, the switch 118 connects the DSP 122 to the hybrid 120 to facilitate communication between the wireless terminal and the external network.

Once a call is in progress, the RF transceiver 102 receives the uplink signals and tunes to the appropriate uplink frequency. The RF transceiver 102 then provides the Rx or uplink signals to the Rx demodulator 106. The Rx demodulator 106 demodulates the uplink signals in order to generate baseband uplink signals therefrom. The DSP 122 then performs decompression and other decoding operations, which are well known in the art, on the baseband uplink signals. The DSP 122 also performs digital to analog ("D/A") conversion on the signals, producing analog uplink signals. The analog uplink signals are then provided through the switch 110 to the hybrid network 120. The hybrid network 120 then provides the analog uplink signals to the external network on the two-wire line as is known in the art.

From the external communication network side, the party connected to the external communication network provides outgoing voice and/or data signals to the wireless terminal through the PBS 34. The external network provides such signals, which are generally analog signals, to the hybrid network 120. The hybrid network 120 provides the analog downlink signals to the DSP 122, which performs the converse of the operations described above in connection with the uplink signals, including A/D conversion and encoding. The DSP 122 provides the resultant signals, or baseband downlink signals, to the Tx modulator 104. The Tx modulator 104 performs the modulation and frequency shifting processes required to generate downlink or Tx signals from the baseband downlink signal. The Tx signal is typically the baseband downlink signal modulated onto an RF carrier having a frequency within the Tx or downlink frequency spectrum, and in particular, 881 MHx+/−12.5 MHz.

Figure 3:
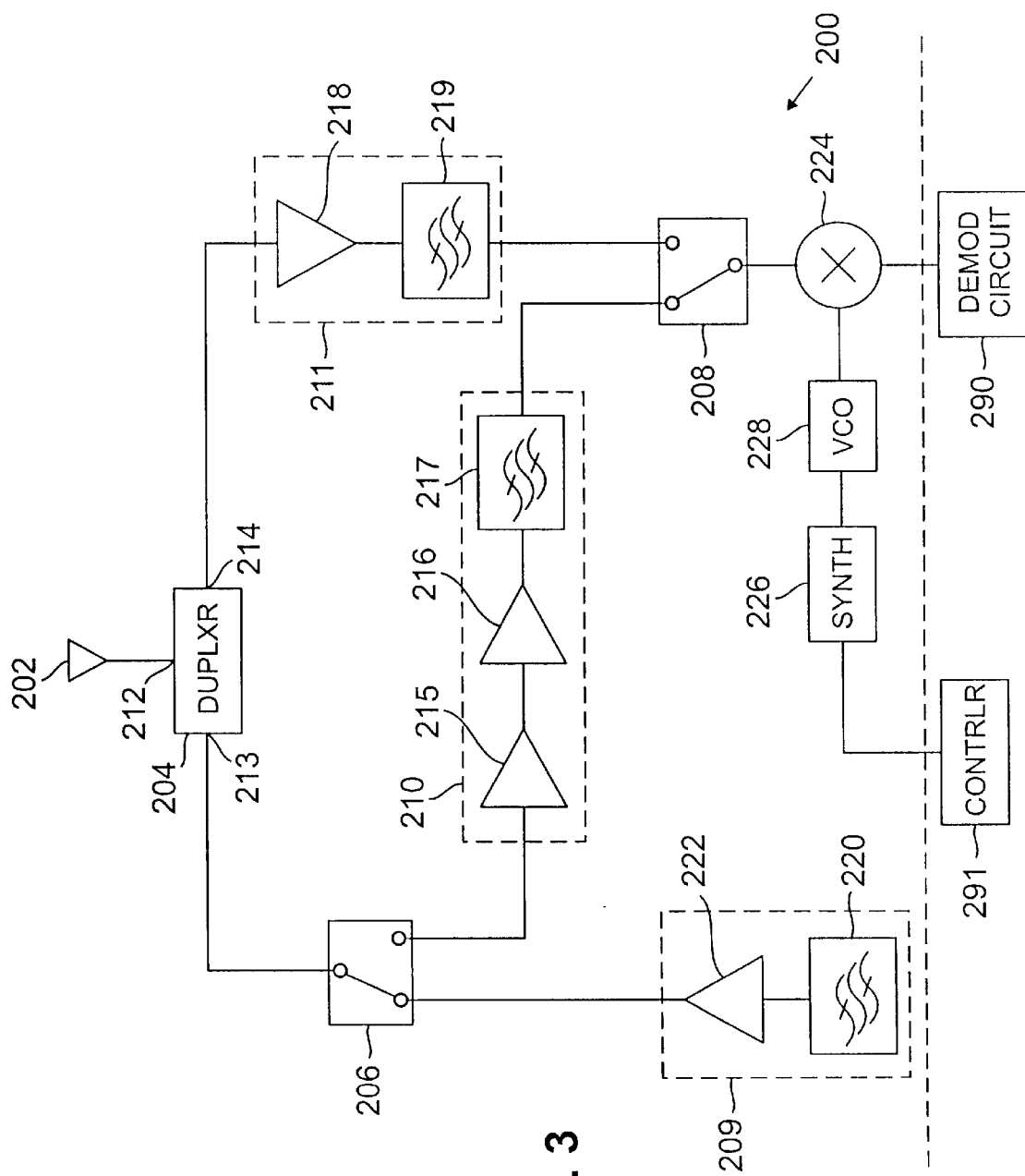
FIG. 3 illustrates a block diagram of an RF transceiver and associated PBS circuitry according to the present invention.

The present invention in the above described embodiment thus provides a PBS that not only transmits and receives call signals, but further monitors signals in both the uplink and downlink channel spectra. Moreover, the PBS does not require separate RF receiving and demodulating equipment to monitor downlink channel frequencies. FIG. 3, described below, illustrates a radio frequency transceiver 200 according to the present invention that facilitates the above described search mode (and normal mode) functionality. The RF transceiver 200 in FIG. 3 may suitably be employed as the transceiver 102 of FIG. 2. Also shown in FIG. 3 are a demodulator circuit 290 and a controller 291 which operate in conjunction with the RF transceiver 200 to provide some of the features of the present invention.

The RF transceiver 200 is designed for use with a personal base station, as well as other types of base stations that may be connected directly or indirectly to a landline telephone network. In fact, the RF transceiver 200 may be used in any base station in which it is desirable to monitor signals in both the uplink and downlink channel spectra.

The exemplary RF transceiver 200 illustrated in FIG. 3 includes the following components, an antenna 202, a duplexer 204, first and second RF switches 206 and 208, respectively, a transmit signal path 209, and first and second RF signal paths 210 and 211, respectively. The antenna 202 is any suitable RF antenna that is operable to receive second RF signals within a second frequency band, typically associated with uplink RF signals, and receive first RF signals within a first frequency band, typically associated with downlink RF signals. The duplexer 204 is essentially a three port signal router and filter that includes a common port 212, a first port 213, and a second port 214. The common port 212 and first port 213 communicate RF signals bidirectionally within the first frequency band while the common port 212 and the second port 214 communicate RF signals bidirectionally within the second band. Further detail with regard to the duplexer 204 is provided below in connection with FIG. 4. The common port 212 is connected to the antenna 202.

The first RF switch 206 and the second RF switch 208 are three port devices that bidirectionally connect a first switch port to either of two other switch ports, or, in other words, are single pole, double throw switches. The first and second RF switches 206 and 208, respectively, may suitable be GaAs MMIC switches such as model SW277 switches available from MaCom, located in Lowell, Massachusetts. The first RF switch 206 is connected to the first band port 213, the first signal path 210, and the transmit signal path 209. The second RF switch 208 is connected to the first RF signal path 210, the second RF signal path 211, and is further operably connected to a demodulator circuit 290 through a tuner circuit. The demodulator circuit 290 may suitable be similar to the demodulator circuit 106 from FIG. 2, above. The tuner circuit comprises a mixer 224, a frequency synthesizer 226, and a voltage controlled oscillator ("VCO") 228. The tuner circuit tunes to the individual channel frequencies for the purposes of call servicing and channel monitoring.

An external controller 291, which is typically located in the base station and may suitably be the controller 108 of the personal base station 34 illustrated in FIG. 2, is operably connected to the first and second RF switches 206 and 208, respectively. The external controller 291 is also operably connected to the frequency synthesizer 226 and VCO 228 to control the tuning operations of the tuner circuit.

The first RF signal path 210 further comprises a first low noise amplifier 215, a serially connected amplifier stage 216, and a serially connected first band pass filter 217. The first band pass filter 217 has a pass band that corresponds to the first frequency band. The second signal path 211 comprises a second low noise amplifier 218 and a serially connected second band pass filter 219. The second band pass filter 219 has a pass band that corresponds to the second frequency band. The first and second low noise amplifiers 215 and 218, respectively, are typically identical low noise RF amplifiers that have operating characteristics suitable for wireless call service. The amplifier stage 216 provides additional amplification in the first signal path 210 that adds sensitivity for more effective channel monitoring. A similar amplifier stage may also be included in the second signal path 211, but may undesirably add to the overall circuitry costs of the RF transceiver 202.

In operation, the RF transceiver 200 provides RF signal routing for both transmitted and received call signals, as well as for monitoring signals having frequencies in both the first and second frequency bands. To this end, the transceiver 200 operates in the search mode and the normal mode, the general nature of which are discussed above in connection with FIG. 2.

In search mode operation, the transceiver 200 receives first signals from the first frequency band and second signals from the second frequency band, and provides them, typically one at a time, to the demodulator circuit 290. The demodulator circuit 290 may then demodulate and/or analyze, the signals to obtain signal strength information in order to facilitate channel monitoring as discussed above in connection with FIG. 2. The first frequency band includes frequencies allocated to one or more transmit or downlink RF signal channels in accordance with a standardized or widely-accepted RF channel allocation. The second frequency band includes frequencies associated with one or more receive or uplink RF signal channels in accordance with a standardized or widely-accepted RF channel allocation scheme.

To monitor the first signals, the first RF switch 206, under the control of the controller 291 connects the first band port 213 to the first RF signal path 210. The second RF switch 208, under the control of the controller provides a connection between the first RF signal path 210 and the demodulator 290. In operation, aerially transmitted RF signals in a plurality of frequencies, which include the first signals, are received by the antenna 202 and provided to the duplexer 204. The duplexer 204 then filters the RF signals and provides the first signals, because of their frequency band, to its first band port 213. Although the duplexer 204 provides some filtering to ensure that the first signals appearing at the first band port 213 contains only frequencies within the first frequency band, other frequencies may nevertheless leak through that typically must later be filtered out.

The first signals then propagate through the switch to the first RF signal path 210. In the first RF signal path 210, the first low noise amplifier 215 and the amplifier 216 amplify the first signals. The first band pass filter 217 then filters the amplified first signals to substantially remove or attenuate any frequencies that are not in the first frequency band. The filtered and amplified first signals then propagate from the first signal path 210, through the second RF switch 208, to the tuner circuitry, and in particular, the mixer 224.

In general, the tuner circuit tunes to a particular channel frequency by generating first IF signals. First IF signals are frequency converted versions of the first signals wherein the channel frequency of interest is converted to an IF. The IF is a predetermined fixed value. In particular, the controller 291 causes the frequency synthesizer 226 and VCO 228 to generate an RF mixing signal at a frequency equal to DCF +/−IF, wherein the DCF is the frequency of the downlink channel of interest and IF is the predetermined intermediate frequency. The RF mixing signal is provided to the mixer 224. The mixer 224 then mixes the RF mixing signal with the first signals to produce a first IF signal. To tune to different channel frequencies, the controller 291 causes the frequency synthesizer 226 and VCO 228 to generate a mixing signal at a different frequency DCF.

The demodulator circuit 290, as is known in the art, then demodulates the first IF signal and generates information or a signal from which a channel availability determination may be made.

To monitor the second signals, the first switch 206, under the control of the controller disconnects the first band port 213 from the first RF signal path 210. The second RF switch 208, under the control of the controller provides a connection between the second signal path 211 and the demodulator circuit 290. In operation, aerially transmitted RF signals in a plurality of frequencies are received by the antenna 202 and provided to the duplexer 204. The RF signals in the plurality of frequencies include the second signals. The duplexer 204 then provides the second signals, because of their frequency band, to its second band port 214. Although the duplexer 204 provides some filtering to ensure that the second signals appearing at the second band port 213 contain only frequencies within the second frequency band, other frequencies may nevertheless leak through that typically must later be filtered out.

The second signals then propagate to the second RF signal path 211. In the second RF signal path 211, the second low noise amplifier 218 amplifies the second signals. The second band pass filter 219 filters out, or in other words, substantially attenuates, any frequency components that are not within the second frequency band. The filtered and amplified second signals then propagate from the second signal path 211, through the second RF switch 208, to the tuner circuit, and in particular, the mixer 224.

The tuner circuit operates to generate second IF signals. The second IF signals are frequency converted versions of the second signals wherein the uplink channel frequency of interest is converted to the IF frequency. The IF frequency is the same fixed value for both uplink and downlink channel frequencies. Accordingly, the controller 291 causes the frequency synthesizer 226 and VCO 228 to generate an RF mixing signal at a frequency equal to UCF +/−IF, wherein the UCF is the frequency of the uplink channel of interest and IF is the predetermined intermediate frequency. The RF mixing signal is provided to the mixer 224. The mixer 224 then mixes the RF mixing signal with the second signal to produce a second IF signal. As with downlink channel frequencies, the controller 291 causes the frequency synthesizer 226 and VCO 228 to generate a mixing signal at a different frequency UCF in order to tune to other uplink channel frequencies.

The demodulator circuit 290, as is known in the art, then demodulates the IF second signal and generates information and/or a signal from which channel availability may be measured.

In normal mode, the first RF switch 206 connects the transmission signal path 209 to the first band port 213 of the duplexer 204, and the second RF switch connects the second signal path 211 to the demodulator 290. In this mode, Tx or downlink RF signals, which have a carrier frequency within the first frequency band, are provided to the transmission signal path 209. The transmission signal path 209 may further include a transmit filter 220 and transmit amplifier 222 for, respectively, filtering and amplifying the Tx signals. To this end the transmit filter 220 should comprise a band pass filter having a pass band that corresponds to the first frequency band.

The Tx signals then propagate through the first RF switch 206 to the first band port 213 of the duplexer 204. The duplexer 204 provides the Tx signals received at the first band port 213 to the common port 212, which in turn provides the Tx signals to the antenna 202 for aerial transmission purposes.

Concurrently with the processing and transmission of Tx signals, the antenna 202 may receive uplink or Rx signals aerially transmitted by an external transmitter, such as one located within a wireless terminal. The Rx signals typically have a frequency within the second frequency band. The Rx signals propagate from the antenna 202 to the common port 212. The duplexer 204 provides the Rx signals appearing at the common port 212 to the second band port 214. The receive signals then propagate from the second band port through the second signal path 211. The second signal path 211 components amplify and filter the Rx signals in a similar manner as discussed above in connection with second signals. The second signal path 211 then provides the Rx signals to the second RF switch 208, which in turn provides the Rx signals to the tuner circuit, which, in the manner described above, tunes to the appropriate channel frequency and provides the Rx signals to the demodulator 290.

The present invention thus includes a novel RF switching scheme that enables a base station transceiver using a single duplexer to facilitate call signal transmission and reception as well as channel monitoring in both the uplink and downlink frequency spectra. The transceiver transmits and receives call signals during normal mode operation, while receiving monitoring signals in search mode operation, typically carried out between telephone calls. Such a transceiver is particularly advantageous in a PBS device, but may further be useful in commercial wireless network base stations.

Figure 4:
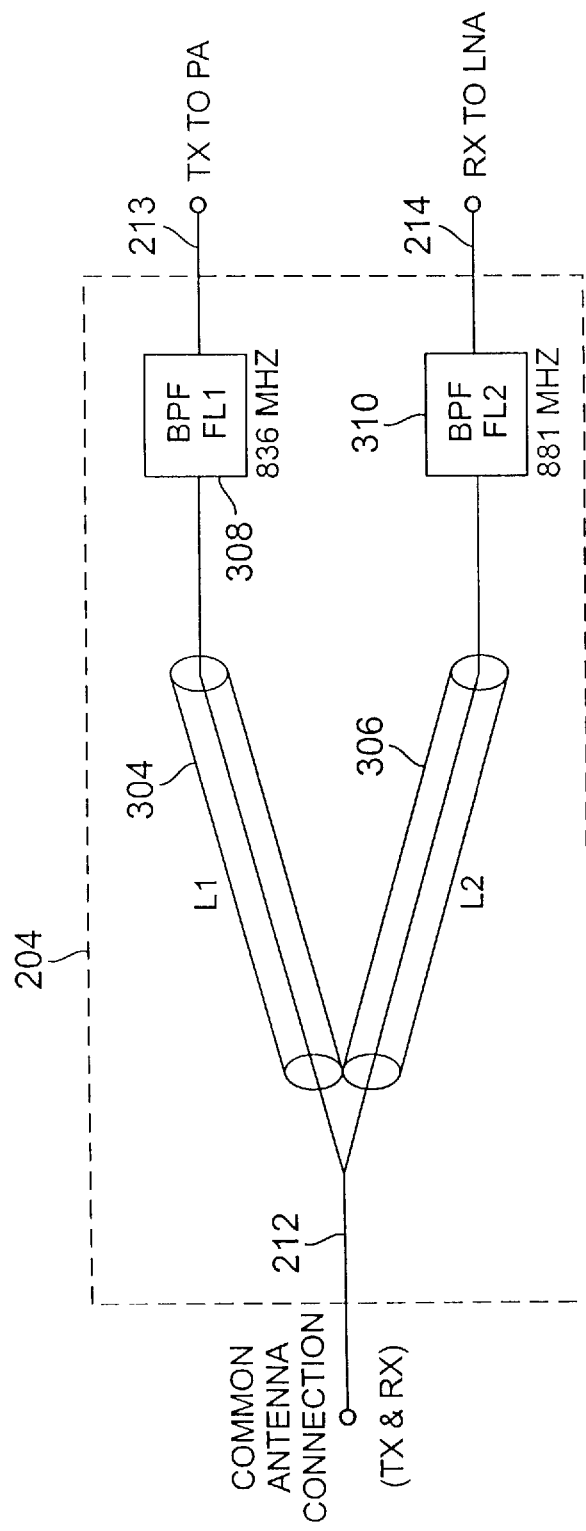
FIG. 4 illustrates a duplexer which may be used in the RF transceiver according to the present invention.

FIG. 4 illustrates an equivalent circuit of a three port duplexer used in wireless communications which may suitably be employed as the duplexer 204 of FIG. 3. Where appropriate, the reference numbers used in FIG. 3 will be used for corresponding components in FIG. 4.

In FIG. 4, the common port 212, which is connected externally to an antenna, is connected to a first transmission path 304 and a second transmission path 306. A first duplex filter 308 is connected between the first transmission line 304 and first band port 213. A second duplex filter 310 is connected between the second transmission line 306 and the second band port 214. The first transmission line 304 is advantageously designed to have a specified length that provides a 50 ohm matching impedance to the first duplex filter 308 at a frequency of 881 MHz while rotating the 836 MHz impedance to an open circuit in order to reduce any loading effect on the impedance of the second duplex filter 310 at the common port 212. The second transmission line 306 is advantageously designed to have a specified length that provides a 50 ohm matching impedance to the second duplex filter 310 at a frequency of 836 MHz while rotating the 881 MHz impedance to an open circuit in order to reduce any loading effect on the impedance of the first duplex filter 308 at the common port 212.

A suitable duplexer is provided by LK Products, and in particular, the model AMPS/TDMA800 Ceramic Duplex Filter. Suitable duplex filters for other wireless systems, including PCS wireless systems, may have similar structures, although designed for operation within different frequency bands. It is to be noted that the above described embodiments are merely illustrative. Those of ordinary skill in the art may readily devise their own implementations that incorporate the principles of the present invention and fall within the spirit and scope thereof. For example, the invention is in no way limited to the use within the cellular telephone frequency scheme discussed above. The present invention is equally useful in any wireless network that allocates uplink signal frequencies in a first frequency band and downlink signal frequencies in a second frequency band.

Moreover, in wireless systems that utilize a half-duplex communication format, the duplexer 204 of FIG. 3 may be replaced with another signal router, such as an antenna switch, and still benefit from the principles of the present invention. An antenna switch is a single pole, double throw RF switch that alternatively connects the antenna port 212 with either the first port 213 or the second port 214. For monitoring first signals (within the downlink frequency band), the antenna switch would operably connect the antenna to the first port. For monitoring second signals (within the uplink frequency band), the antenna switch would operably connect the antenna to the second port. The RF transceiver circuitry and operation could otherwise be consistent with that described above in connection with FIG. 3. At present, such a half-duplex wireless communication format is employed by the GSM global mobile system.

We claim:

1. A signal processing arrangement for use in a base station, the base station operable to transmit downlink signals within a first frequency band to one or more wireless terminals and receive uplink signals within a second frequency band from one or more wireless terminals, the arrangement comprising:
   a) a demodulation circuit operable to demodulate RF signals;
   b) a modulation circuit operable to modulate RF signals;
   c) a radio frequency ("RF") transceiver, said RF transceiver further comprising,
      an antenna operable to receive first RF signals within a first frequency band, and second RF signals within a second frequency band,
      a signal router connected to the antenna and having first and second ports, said signal router operable to provide signals within the first frequency band between the first port and the antenna and signals within the second frequency band between the second port and the antenna;
   d) a controller, said controller operable to cause the first port to be operably connected to the demodulation circuit to facilitate monitoring of the first RF signals, and wherein the controller is further operable to cause the second port to be operably connected to the demodulation circuit to facilitate monitoring of the second RF signals.

2. The signal processing arrangement of claim 1 wherein the controller is further operable to cause the first port to be connected to the modulation circuit to facilitate transmission of downlink signals, and further operable to cause the second port to be operable connected to the demodulation circuit to facilitate the reception of uplink signals.

3. An arrangement for monitoring RF signals for use in a base station, said arrangement comprising:

a) a demodulation circuit operable to demodulate RF signals;
   b) a radio frequency ("RF") transceiver, the RF transceiver operable to transmit downlink RF signals to a wireless terminal and receive uplink RF signals from the wireless terminal, said RF transceiver further comprising,
      an antenna operable to receive first RF signals within a first frequency band, and second RF signals within a second frequency band,
      a signal router connected to the antenna and having first and second ports, said signal router operable to provide signals within the first frequency band to the first port and signals within the second frequency band to the second port;
      a first RF switch connected to the first port;
      a first RF signal path connected to the first RF switch;
      a second RF signal path connected to the second port;
      a second RF switch connected to the first RF signal path and the second RF signal path, said second RF switch having an output for connection to the demodulation circuit, and
   c) a controller, said controller operably connected to the first RF switch, the second RF switch, and the demodulation circuit;
      wherein the controller causes the first RF switch to connect the first RF signal path to the first port and further causes the second RF switch to connect the first RF signal path to the demodulation circuit to facilitate monitoring of the first RF signals, and wherein the controller causes the second RF switch to connect the second RF signal path to the demodulation circuit to facilitate monitoring of the second RF signals.

4. The arrangement of claim 3 wherein the demodulation circuit is further operable to obtain signal strength measurements from the first and second RF signals and communicate the signal strength measurements to the controller to facilitate the monitoring of the first and second RF signals.

5. The arrangement of claim 3 wherein the antenna is further operable to transmit downlink RF signals within the first frequency band and wherein the first switch is operable to connect a modulation circuit to the first port to facilitate the transmission of downlink RF signals.

6. The arrangement of claim 5 wherein the antenna is further operable to receive uplink RF signals within the second frequency band and wherein the second switch is operable to connect the demodulation circuit to the second RF signal path to facilitate the reception of downlink RF signals.

7. The arrangement of claim 3 wherein the first RF signal path includes a first low noise amplifier and a serially connected first band pass filter, the first band pass filter having a pass band that corresponds to the first frequency band, and wherein the second RF signal path includes a second low noise amplifier and a serially connected second band pass filter, the second band pass filter having a pass band that corresponds to the second frequency band.

8. The arrangement of claim 3 wherein the transceiver further comprises a tuner circuit, said tuner circuit operable to tune to a particular downlink channel frequency in order to facilitate the monitoring of first signals and operable to tune to a particular uplink channel frequency to facilitate the monitoring of second signals.

9. The arrangement of claim 8 wherein the tuner circuit further comprises a mixer connected between the second RF switch and the demodulator circuit, a voltage controlled oscillator connected to the mixer and a frequency synthesizer connected to the voltage controlled oscillator.

10. The arrangement of claim 9 wherein the processor is further operably connected to the tuner circuit in order to control the operations thereof.

11. The arrangement of claim 3 wherein the signal router comprises a duplexer.

12. The arrangement of claim 3 wherein the signal router comprises a signal pole, double throw switch.

13. A radio frequency ("RF") transceiver for a base station, the RF transceiver operable to transmit downlink RF signals to a wireless terminal and receive uplink RF signals from the wireless terminal, said RF transceiver comprising:
- an antenna operable to receive first RF signals within a first frequency band, and second RF signals within a second frequency band;
- a signal router connected to the antenna and having first and second ports, said signal router operable to provide signals within the first frequency band to the first port and signals within the second frequency band to the second port;
- a first RF switch connected to the first port;
- a transmission signal path connected to the first RF switch and operably connected to the external modulation circuit;
- a first RF signal path connected to the first RF switch;
- a second RF signal path connected to the second port;
- a second RF switch connected to the first RF signal path and the second RF signal path, said second RF switch having an output for connection to a demodulation circuit,
- wherein the first RF switch operably connects the first RF signal path to the first port and the second RF switch connects the first RF signal path to the demodulation circuit to facilitate monitoring of the first RF signals, and wherein the second RF switch operable connects the second RF signal path to the demodulation circuit to facilitate monitoring of the second RF signals.

14. The RF transceiver of claim 13 wherein the antenna is further operable to transmit downlink RF signals within the first frequency band and wherein the first RF switch is operable to connect the transmission path to the first port to facilitate the transmission of downlink RF signals.

15. The RF transceiver of claim 13 wherein the antenna is further operable to receive uplink RF signals within the second frequency band and wherein the second RF switch is operable to connect the demodulation circuit to the second RF signal path to facilitate the reception of uplink RF signals.

16. The RF transceiver of claim 13 wherein the first RF signal path includes a first low noise amplifier and a serially connected first band pass filter, the first band pass filter having a pass band that corresponds to the first frequency band, and wherein the second RF signal path includes a second low noise amplifier and a serially connected second band pass filter, the second band pass filter having a pass band that corresponds to the second frequency band.

17. The RF transceiver of claim 13 further comprising a tuner circuit, said tuner circuit operable to tune to a particular downlink channel frequency in order to facilitate the monitoring of first signals and operable to tune to a particular uplink channel frequency to facilitate the monitoring of second signals.

18. The RF transceiver of claim 17 wherein the tuner circuit further comprises a mixer connected between the second RF switch and the demodulator circuit, a voltage controlled oscillator connected to the mixer and a frequency synthesizer connected to the voltage controlled oscillator.

19. The RF transceiver of claim 13 wherein the signal router comprises a duplexer.

20. The RF transceiver of claim 13 wherein the signal router comprises a signal pole, double throw switch.

21. A method of providing RF signals to a demodulation circuit of a wireless communications base station, the base station operable to transmit downlink signals within a first frequency band to one or more wireless terminals and receive uplink signals within a second frequency band from one or more wireless terminals, the method comprising:
- a) receiving first RF signals within the first frequency band, and second RF signals within the second frequency band,
- b) providing the first RF signals and second RF signals to a signal router within the base station, the signal router having first and second ports, the signal router operable to provide signals within the first frequency band to the first port and signals within the second frequency band to the second port;
- c) connecting the first port to a demodulation circuit to provide the first signals to the demodulation circuit; and
- d) connecting the second port to the demodulation circuit to provide the second signals to the demodulation circuit.

22. The method of claim 21 wherein the base station further comprises a first signal path, a second signal path, the second signal path connected to the second port, and step c) further comprises:
- connecting the first port to the first signal path and the demodulation circuit to the first signal path in order to provide the first signals to the demodulation circuit.

23. The method of claim 21 wherein the base station further comprises a first signal path, a second signal path, the second signal path connected to the second port, and step d) further comprises:
- connecting the second signal path to the demodulation circuit in order to provide the second signals to the demodulation circuit.

24. The method of claim 21 further comprising the steps of:
- e) providing downlink signals having a downlink frequency corresponding to an RF channel and in the first frequency band to the first port of the signal router;
- f) transmitting the downlink signals to an external wireless terminal;
- g) receiving uplink signals having an uplink frequency corresponding to the RF channel and in the second frequency band from the external wireless terminal; and
- h) providing the uplink signals to the second port of the signal router.

\* \* \* \* \*